June 6, 1944.  E. A. RICHARDSON  2,350,532
METHOD OF WELDING
Filed June 4, 1941
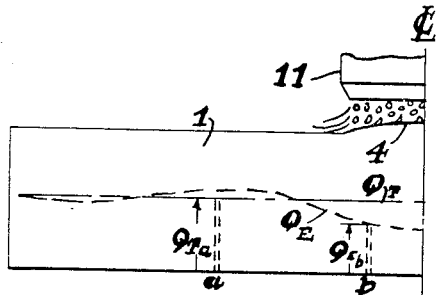
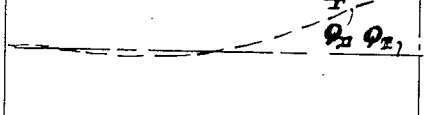
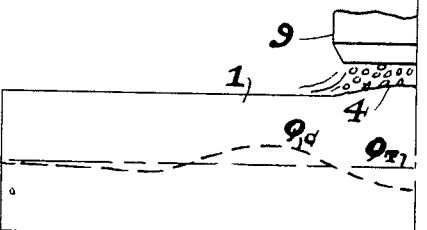
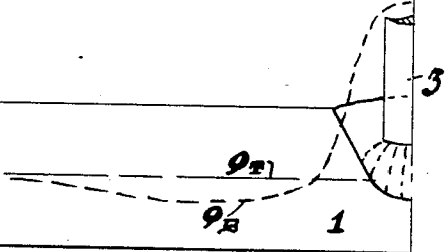
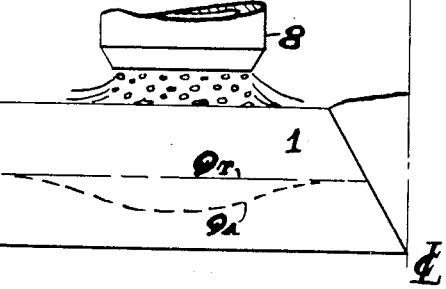
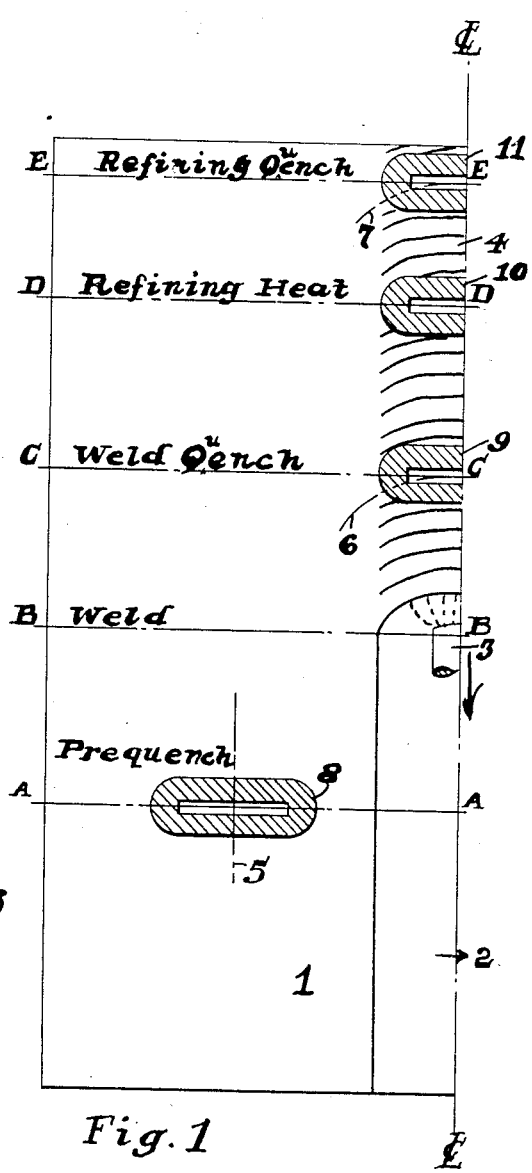
Edward Adams Richardson INVENTOR.

Patented June 6, 1944

2,350,532

UNITED STATES PATENT OFFICE 2,350,532

METHOD OF WELDING

Edward A. Richardson, Bethlehem, Pa.

Application June 4, 1941, Serial No. 396,485

8 Claims. (Cl. 148—21.5)

This invention relates to a method of welding, more particularly a method of welding in which the weld and the region affected by the welding heat is heat-treated as the welding operation proceeds so that the resulting part or assemblage requires no general heat treatment.

More specifically, this invention is directed to the welding of heat-treatable materials, particularly but not exclusively ferrous alloys, in a heat-treated condition in such manner as to produce a weld with physical properties substantially equivalent to those of the treated material being welded, avoiding the necessity for a general subsequent heat treatment of the resulting part or assemblage.

One object of this invention is to provide a process for welding thin sheets of previously heat-treated material of high strength, in particular heat treated steels, into assemblages and structures having joints substantially as strong as the heat-treated sheets. Such a process is very important in the fabrication of structures of such thin material when it is desired to obtain the full advantage both of the high strength of the material and the ease of fabrication by welding, and it would be impracticable or impossible to heat-treat the assembly after welding. Substantial avoidance of distortion and internal stresses is inherent in the process.

Another object of this invention is to provide a process by which much thicker plates or sections of hardened or hardenable alloys, in particular alloy steels, may be welded without cracking, and at the same time a joint of substantially the strength, hardness and impact strength of the plate material may be secured, while avoiding the necessity for heat-treating the resulting part or assemblage as a whole subsequent to welding.

Another object of my invention is to provide a process for welding hardened or hardenable materials in such a manner that the internal stresses in and adjacent to the joint are greatly reduced or substantially eliminated, and the tendency toward distortion in welding is similarly greatly reduced or eliminated.

Another object of my invention is to facilitate the welding of those hardenable or hardened alloys, which tend to crack under usual welding stresses, through the elimination of such cracks and the substantial elimination of the stresses responsible for such cracking, thereby greatly increasing the utility and ease of fabrication of such alloys.

Other objects and advantages will be apparent as the invention is more fully described.

A welding operation, as the term is used in this specification, is any operation in which the metal to be united, with or without added weld metal, is locally heated to a fusion temperature and the parts united by the solidification of the fused metal. It includes the various spot, seam, butt and shot welding operations, and fusion welds with metallic arc, carbon arc, oxy-acetylene torch, and atomic hydrogen torch, etc. The operation known as hard-surfacing in which a surface of hard or hardenable material is placed over the surface of a softer body by welding on a succession of beads of the hard material, is also included as a form of welding.

Hitherto, in general, welding has been carried out with the metal to be welded at or close to ordinary atmospheric temperatures, except in the immediate vicinity of weld. This cold metal immediately adjacent to the newly placed weld material exerts a quenching effect thereon which limits the grain size of the softer materials. Applied to harder materials, however, the stresses set up would, and do, produce cracking on such severe quenching action.

It has previously been found that many hard, or hardenable, materials may be welded successfully without cracking by first preheating the parts to be welded to an elevated temperature depending largely upon the alloy being welded. Such temperatures may be as low as 200 or 300 degrees F., or perhaps, in rare instances, as high as 1200 degrees F. Otherwise the procedure remains unchanged.

In general, alloys other than the soft and structural steels, or the non-hardenable (except by cold work) austenitic alloys, cannot be given welds of great strength and reliability unless the welded structures are subjected to a heat-treating operation after the welding work has been done. The welds in soft, and structural, steels have strengths equivalent to the materials being welded, which are in general in the soft condition as rolled, normalized, or annealed, and have sufficient toughness to be reliable for structural joints provided the welds are not too large.

Many specifications provide that important parts or structures, such, for example, as pressure vessels, shall be fully annealed after welding. Others specify a shorter process, or stress-relief anneal. Others permit of a normalizing operation which relieves stresses and gives some hardening effect and improved grain refinement by the more rapid cooling by air from the annealing, or more exactly, the slightly higher normalizing temperature. Some few examples exist of parts which are welded with hardenable material from pieces of soft or hardenable material, or perhaps a combination, and are subsequently given a quenching and tempering treatment. Such quenching and tempering normally must be preceded by an annealing operation for stress relief and grain refinement.

Where a higher strength of structural material and its welds is required, it has been customary to utilize, at least in the thinner materials, some suitable form of air-hardening alloy with filler metal of similar or equivalent composition, depending on the quenching effect of the cold material adjacent to the weld and the relatively rapid cooling by the atmosphere to refine the grain and harden the material which has been heated. Chrome-molybdenum tubing for aircraft construction is an example in point.

The austenitic welds and some others may be given a stress relief and increased hardness and strength and reliability through working the metal in the weld plastically with hammer blows, a process known as peening. Much depends upon the care and skill of the workman in such operations, however.

Before proceeding to describe my invention, certain aspects of heat-treatment will be briefly pointed out. Hardening may be made to occur whenever an alloy consisting of one solid solution at and above some elevated critical temperature breaks up into two phases, in general solid solutions, below that elevated temperature in such a way that one such solid solution is finely distributed through the body. Change in crystal habit of one of the phases with temperature may be involved, as the formation of an iron-carbon phase called martensite on the very rapid cooling of steel, which martensite may be caused to transform into ferrite and cementite on reheating or tempering. Age hardening occurs when one solid solution contains much more of the other phase in solution at higher temperatures than at lower ones, may be supercooled by rapid quenching without transformation, and yet with time and perhaps a slight temperature increase the excess dissolved material precipitates in a finely distributed form throughout the extent of said solid solution. Duralumin, and beryllium copper are non-ferrous alloys subject to age hardening after cooling or quenching, while low carbon steel with 2 or 3% copper, or very low carbon steel alone, are subject to very appreciable age-hardening. So far as my invention is concerned, age-hardening and the more usual hardening by rapid cooling below a critical temperature will be considered as related hardening methods.

As an example of the effects of transformation at different temperatures, consider a 0.78% carbon, 0.36% manganese, 0.160% silicon steel. Its critical temperature, in this case the eutectoid temperature, is about 1340 degrees F., so it must be quenched from above this temperature to secure hardening, and after the austenite change has been completed by soaking at such temperature. Cooling rapidly to 1300° F., a wait of over 15 seconds is required for the beginning of transformation, a total of nearly 8 minutes for its end. The resulting structure is a coarse pearlite of hardness 14 on the Rockwell C-scale. If the sample had been rapidly cooled to 1200° F., transformation would have started in 3 seconds, finished in 10 seconds, a fine pearlite would result, and its hardness would be 28 on the Rockwell C-scale. Now at about 1000° F. the transformation starts most rapidly, taking less than 1 second, while the change is complete in about 5 seconds, the structure is a finer pearlite, and the Rockwell C-scale hardness is now 36. From this temperature down to about 550° F., the start of transformation takes longer and longer, and down to about 350° F. the end of transformation takes longer and longer. At 600° F., the start of transformation takes nearly 50 seconds, the change is not completed for nearly 10 minutes, the structure is troostite (a very fine, unresolvable [microscopically] pearlite [or embryo pearlite]) having a Rockwell C-scale hardness of 52. Below about 500° F., and above about 320° F., the structure is a mixture of troostite and martensite with a Rockwell C-scale hardness of 58 at the lower temperature. The maximum time for transformation, at about 350° F., is nearly 1 week. Below this level, martensite is formed more and more rapidly the lower the temperature, the Rockwell C-scale hardness reaching 64 below about 250° F. At 100° F., the martensite begins to transform in 1 second; the transformation is complete in about 2 seconds.

This data, when plotted with temperature against the logarithm of transformation time, gives one of the well-known S-curves of Davenport and Bain. Though slightly different curves characterize steels of different carbon content, and the alloy steels, certain basic tendencies of all hardenable alloys are exhibited in this common type of steel.

With this background in mind, the general nature of the improved welding process in accordance with this invention may now be described, in connection with the accompanying drawing, in which:

Figure 1 is a plan view illustrating, somewhat diagrammatically, two scarfed plates being butt-welded by the process of this invention, Figure 2 is a sectional view on the line A—A in Fig. 1, the heat content of the parts being welded being diagrammatically shown therein, Figure 3 is a sectional view on the line B—B in Fig. 1, the heat content of the parts being welded being diagrammatically shown therein, Figure 4 is a sectional view on the line C—C in Fig. 1, the heat content of the parts being welded being diagrammatically shown therein, Figure 5 is a sectional view on the line D—D in Fig. 1, the heat content of the parts being welded being diagrammatically shown therein, Figure 6 is a sectional view on the line E—E in Fig. 1, the heat content of the parts being welded being diagrammatically shown therein.

In all the figures one-half of the view only is shown, each figure being symmetrical about the center lines CL.

In accordance with my invention I maintain the parts being welded, or at least those portions thereof which would be "heat affected" by the welding operation, and preferably for some little distance beyond so as to establish a heat reservoir, as hereinafter explained, and the weld itself, as nearly as possible at a predetermined transformation temperature T from a time as early as practicable following the completion of the welding operation until the desired transformation taking place at that temperature is substantially complete.

Generally, but not always, the transformation temperature selected will be considerably above room temperature. It will be chosen to coincide with the transformation temperature of the heat treated material being welded if such heat treatment involved quenching from above the critical temperature to a definite transformation temperature; or a temperature not in excess of the tempering temperature if the material being welded was drawn and tempered.

The weld metal, when added metal is used, will preferably be of substantially the same composition as the material being welded, so that on transformation, at the assigned temperature, a truly uniform structure will result.

When hard-surfacing, the transformation temperature selected will depend upon the characteristics desired in the surface metal, so long as no injury to the base metal will result from transformation at this temperature.

The portion of the material to be welded which must be brought to the temperature T is largely dependent upon the temperature selected and the ease of applying and maintaining the pre-heat. Thus with a relatively low transformation temperature, thin plates may be preheated throughout their entire extent.

The portion which must be brought to transformation temperature is that region which will be "heat-affected" by the welding operation. This term is well known in the art of welding and is used to designate those regions of the material being welded which are heated to above a critical temperature. In plain carbon steels, this would mean those regions heated above the $A_1$ point (720° C.). (In cold worked steels recrystallization of ferrite may take place at 500°–600° C., and to this extent they may be said to be "heat affected" at those temperatures. Material only so affected, however, is not considered to be "heat affected" as that term is used in this specification.)

Desirably, however, a region several times that of the heat affected region will be brought to transformation temperature in order to provide a substantial heat reservoir at this temperature, which will to a great extent "buffer" the localized heating and cooling steps to be described.

Ordinarily, in accordance with this invention, those portions of the parts being welded which are to be maintained at the predetermined transformation temperature will be preheated to such temperature, and held at that temperature following the welding operation until the desired transformation is substantially complete.

In the drawing the plates 1, 2 being welded throughout the portions shown in the several views (and for some distance beyond) have been preheated to a temperature T corresponding to the desired transformation temperature. The pre-heating means are considered to be in operation during and following the welding operation, so as to maintain the prescribed temperature T. The heat content of the material at this point is indicated in Figs. 2 to 6 by the line $Q_T$, the height of which above the base is a measure of the amount of heat present.

It is obvious that in the welding operation additional heat is added to the system. If no allowance were made therefor a considerable portion of the material present, including the bead itself, would be raised to and maintained at a temperature above T and would transform at a higher temperature rather than at the desired temperature T. Consequently it is necessary to remove from the system, before, during or after the welding operation, but before transformation, an amount of heat equal to the excess heat added during welding.

To accomplish this the material to be welded is, in accordance with this invention, preferably prequenched throughout an area closely adjacent, but not including, the line of weld, to abstract therefrom a determined amount of heat.

Referring to the drawing, in Fig. 1 there is shown a weld joining plates 1 and 2 in the process of being formed, welding proceeding in the direction of the arrow. A prequench nozzle 8 precedes the welding rod 3 and quenches the material along the line 5. The quenching may be accomplished by any fluid forcefully projected from the nozzle 8. Thus, a gas, preferably a non-oxidizing one, as nitrogen; a liquid, as water; or most desirably, because of the nicety of control available, an atomized spray of liquid in a gas stream, may be used.

As a result of the prequench the heat distribution in the material along the line A—A will be that shown by the line $Q_A$ in Fig. 2.

Welding now takes place at the line B—B, and at the instant of bead deposition the heat distribution in the material along this line is that shown by the line $Q_B$ in Fig. 3. It will be noted that a heat depression (below $Q_T$) still exists at the left, and a comparatively narrow heat peak through the weld bead exists at the right.

Theoretically it is possible to abstract by the prequench a quantity of heat exactly equal to that added in the welding operation. The areas defined by $Q_B$ above and below the line $Q_T$ would in that case be equal, and the temperature in the weld bead would fall to T as that in the adjacent material rose to the same temperature. It would then only be necessary to hold the material at T until transformation was complete and the weld would be finished for use.

While it is sometimes feasible to proceed in this manner, it is not always practicable to prequench to the desired extent, at least without cooling the line of weld, and this of course is to be avoided. In such cases an afterquench is required.

In Figure 1 there is shown at 9 an afterquench nozzle adapted to project a quenching fluid along the line 6 and upon the weld bead as soon as practicable after it has been laid down. The heat distribution in the material along the line C—C is shown by the line $Q_C$ in Fig. 4. At the left a part of the heat depression due to the prequench remains, although this has been largely filled in by heat from the main mass at temperature T and by heat from the heat peak shown in Fig. 3. Further to the right a heat elevation (above $Q_T$) remains from the heat peak due to welding; while at the extreme right a heat depression, due to the afterquench, is shown.

The bead is thus now at a temperature below the desired transformation temperature T, but heat from the main mass of material at temperature T and, more rapidly, from the heat elevation immediately adjacent the bead, will bring the bead up to temperature T, preferably before transformation at the lower temperature begins, and in any case before transformation at such lower temperature is complete. Transformation will then become complete at temperature T.

In some cases it will be possible to dispense with prequenching and rely upon afterquenching to bring the bead temperature rapidly down to the desired transformation temperature. However, care must be taken to insure that the bead is not damaged by application of quenching medium too soon after its deposition. The prequench insures that the afterquench can be delayed until solidification of the bead is complete, as it must be to avoid injury, and yet the temperature will be brought down to temperature T before transformation at a higher temperature can begin, or at least be complete.

Prequenching serves another most important purpose. Great difficulty has sometimes been inexperienced in welding because of the tendency of two plates either to spread apart or close up on each other as welding proceeds. The method of pre-quenching in accordance with this invention acts, by cooling ahead of the welding point and parallel with the line of weld, to contract the metal in the sheet, thus opening the joint, and permitting a weld to be deposited which will be sufficiently large to take up, through the contraction of the hot bead of weld metal as it cools, the expansion caused by reheating of the cooled zones. By balancing, wholly or partially, these tendencies to expand and contract, a joint may be produced in which distortion and the resultant stresses are considerably reduced.

In ordinary welds, inasmuch as the bead is larger on top, and so contracts more there, there is a tendency for the two plates being united to lift, forming a wide angle V section of the upper surface. But since the cooling by surface quenching removes more heat from the surface than from the interior and lower parts of the plate, this pre-quenching effect tends to reduce the amount of lift and thereby makes the V angle tend to remain almost if not quite 180°, so that the two plates being joined tend to lie in the same plane. These effects of controlling distortion and reducing the locked up stresses are important and are advantages securable through utilization of some measure of prequenching in accordance with this invention.

In a single pass weld it will be desirable to refine the bead; and in a multi-pass weld, to refine the last bead, by heating it to just above the critical temperature $A_3$ and then quenching to the desired transformation temperature.

In Figure 1 there is shown at 10 a flame nozzle for application of refining heat, and at 11 a refining quench nozzle for quenching along the line 7. The heat distribution on the line D—D, where the bead has been heated by a gas jet from nozzle 10, is shown by the line $Q_D$ in Fig. 5. The heat distribution on the line E—E, after the refining quench, is shown by the line $Q_E$ in Fig. 6. The left remnant of a depression persists from the prequench, the elevation is the remnent of heat added by the refining flame, and the right depression is that created by the refining quench.

The heat at the level $Q_T$ in the mass of the material will operate to bring the entire region rapidly to that heat level; and the whole system will be kept at the temperature T until transformation is complete.

While a metallic arc fusion weld has been described, yet so long as heat may be applied rapidly and sufficiently locally, any form of heating or welding apparatus may be used. In fact, electrically butt-welded joints may be subjected to a quenching operation immediately following welding. The pieces being welded should, of course, be at transformation temperature throughout, or at least within range of heat effects from the joint, and should be put in a heated enclosure for maintaining them at transformation temperature for at least the minimum required time. In the case of spot, shot, or seam welding, the materials to be welded should be at transformation temperature during the welding operation, and quenching should immediately follow welding, even to the extent of timing a drop of water of proper size to be sprayed on the spot the instant the welding current shuts off and even before the pressure is released, if possible. In the case of spot and seam welding, the quench must follow the welding operation as closely as possible, applying a metered drop forcefully at the weld last completed which is not yet quenched.

Though it may seem that what has been said applies only to thin materials, actually material of almost any thickness may be welded provided the alloy does not require too rapid a quench and provided reasonable rapidity of bead laying is possible. Even simple carbon steels may be welded in the hardened state and in thick plates, provided not a perfect structure, but an improved one, is suitable. It will be realized that a rate of quenching sufficiently slow to permit some fine pearlite to form, owing to the fact the temperature-time curve of the quench crosses the S-curve of beginning of transformation, may not be undesirable provided most of the transformation occurs at the desired temperature. Although pearlite starts to form in less than 1 second, the transformation is not complete for nearly 5 seconds. If, in the case of 0.78% carbon steel, the rate of cooling from above the critical is such that not more than 2 or 3 seconds elapse in cooling through 1000° F., less than 50% of the structure will be fine pearlite, the rest troostite.

In general, however, when hardened plates are to be welded in that condition, some alloy steel must be used to insure a low enough rate of quenching.

In connection with thick plate welding, it should be noted that reasonably small beads should be used. Where one bead is laid down beside another within the time period required for full transformation, it is desirable, if possible, to place beads in such manner as to leave beads undisturbed until the transformation is complete. With a welding rate of, say, 30 feet per hour, and a transformation time of 10 minutes, it is desirable to have welds at least 5 feet long if the next bead is to be laid against that just deposited. If beads can be alternated, then 2½ feet may suffice. Sometimes, however, production rates will suggest that a concession in hardness and structure be made. If the desired structure is Rockwell C-scale 52 at 600° F. with a 10 minute transformation, it may be desirable to go to Rockwell C-scale 44 by using a transformation temperature of 700° F. corresponding to a transformation time of about 3 minutes. Obviously some pieces can be welded or facehardened by charging into a furnace at the end of one bead for sufficient time to permit transformation, then proceeding to the next bead.

The following specific examples of welding operations with various types of materials in accordance with this invention will serve to illustrate further the nature of the invention.

Consider the welding of hardened plain carbon steel (S. A. E. 1080—0.80% C) ⅛" plates having a hardness of 41—42 on the Rockwell C scale produced by heating to 1500° F., quenching in oil, and reheating to about 600° F.

Welding this material with a shielded arc electrode in accordance with conventional welding practice at a rate of about 0.33 inch per second involves an energy input from the arc of about 11,500 B. t. u./hr., of which about 20% is lost from the system and 80% is used in melting the material forming the weld and raising the temperature of the adjacent material. In theory this 80%, or 9,200 B. t. u./hr., no more, no less, should be removed in quenching. Actually, to insure sufficiently rapid cooling, and because of the "heat reservoir" provided by the mass of material being welded in accordance with this invention, quantities considerably in excess thereof may be removed.

The transformation temperature of the steel in question to produce a material of 41—42 hardness is about 760° F. and the corresponding transformation time is about 1½ minutes. Since this is above the tempering temperature, the latter will govern the welding temperature for the material as a whole.

The plates to be welded are accordingly maintained at a temperature of about 600° F. during the welding operation.

The prequench should extend about ½ inch ahead of the electrode and take place on lines ½ inch on either side of the line of weld, since these will substantially define the area in which any appreciable temperature rise will occur. The exact amount of cooling to be provided can only be determined by trial, but about 6,000 B. t. u./hr. should be removed ahead of the electrode.

The final or after-quench will of course follow the electrode, and must be sufficiently behind the electrode to permit all parts of the weld to solidify before the quenching medium is applied. Usually the quench may be applied ¼–⅜ inch behind the point of welding. About 6,000–7,000 B. t. u./hr. should be removed by this quench. (The excess of heat withdrawn over that put in is to take care of flow from the "heat reservoir" portions of the plates.)

In general the quenching fluid, both for pre-quenching and for after-quenching, should flow along the plate surface in the direction of elecrode motion. The heat removed in the quenching is known, or may be determined more accurately on trial, and the final temperature of the fluid will be approximately the desired transformation temperature in pre-quenching, or amount the solidus temperature in after-quenching. Preliminary estimates of the rate of fluid flow may be made on this basis, and ordinary adjustments may be made after tests. When droplets of water are added in the air, or other gas stream, both the sensible heat and the latent heat of evaporation must be considered in estimating fluid quantities.

If the carbon steel plates being welded had been hardened by "austempering," as by heating to 1450–1475° F., rapid quenching to about 760° F., and holding at that temperature for about 1½ minutes, a procedure which would give about the same type of product; the welding operation would proceed substantially as above, except that the plates would be maintained at about 760° F., the transformation temperature, during welding.

Chrome-molybdenum steel plates, for example, S. A. E. 4140, with a composition of 0.37% C; 0.77% Mn; 0.98% Cr; 0.21% Mo; balance substantially iron; may be welded in similar manner in accordance with this invention. This steel may be given a 41—42 hardness either by heating to 1575° F., quenching in oil, and tempering at about 925° F.; or by heating to 1445–1575° F., rapidly quenching to about 775° F., and holding at that transformation temperature for at least 4 minutes. In either case the plates will be maintained at about 775° F., the desired transformation temperature, during welding.

In all these steels there is no substantial difference in the character of heat flow, the heat required for welding, etc., so that, except for the temperature maintained in the plates during welding, no substantial change in welding procedure is required.

Where the welding speed is varied from the 0.33 inch second assumed in the examples above, the distances from the point of weld for pre-quenching operations should be varied as the square root of the time required for the electrode to come abreast of the cooled region. Other dimensions may be similarly varied.

Those distances, as the lateral distance from the line of weld to the line of pre-quenching, which are dependent upon the rate of heat flow, must also be varied in proportion to the square root of the thermal diffusivity of the metal being welded. This change is not large for any ferrous alloy, but may be important in some hardenable non-ferrous materials.

For example, 2.15% beryllium-copper plates in age-hardened condition may be welded in accordance with this invention by welding at a transformation temperature of about 570° F. Since the heat diffusivity is much greater than for steel (the square roots are in the proportion 11:8), the distance of the pre-quench line from the weld line should be increased about 40% over that in the preceding examples for steel if the welding rate is to remain the same. Alternatively a higher welding rate could be used. The after-quench should follow the weld as closely as practicable, allowing time for solidification of the weld.

Since nearly two hours are required for transformation of this material, better results may be secured by reheating to about 1470° F., holding for 2–3 hours, quenching, and then heating at 570° F. for about two hours.

It will be appreciated that the various details and examples hereinbefore set out are merely illustrative of desirable procedure in accordance with this invention, and in no wise limit the scope of the invention as defined in the claims hereinafter set forth.

What I claim and desire to protect by Letters Patent is:

1. The method of welding hardenable materials which comprises establishing a predetermined transformation temperature to yield desired physical properties in at least those portions of the material to be welded which will be heat affected in the welding operation, then making a weld, then, before the weld has cooled substantially, rapidly withdrawing heat from the weld joint and the heat affected regions adjacent thereto so as to bring the temperature thereof to said predetermined transformation temperature as quickly as possible and before transformation at any other temperature can be substantially complete, and maintaining said transformation temperature until transformation is substantially complete.

2. The method of welding hardenable materials which comprises establishing a predetermined transformation temperature to yield desired physical properties in at least those portions of the material to be welded which will be heat affected in the welding operation, then making a weld, then, before the weld has cooled substantially, applying a forced fluid quench to the weld joint and the heat affected regions adjacent thereto so as to bring the temperature thereof to said predetermined transformation temperature as quickly as possible and before transformation at any other temperature can be substantially complete, and maintaining said transformation temperature until transformation is substantially complete.

3. The method of welding hardenable materials which comprises preheating at least those portions of the material to be welded which will be heat affected in the welding operation to a predetermined elevated transformation temperature to yield desired physical properties, then making a weld, then, before the weld has cooled substantially, rapidly withdrawing heat from the weld joint and the heat affected regions adjacent thereto so as to bring the temperature thereof to said predetermined transformation temperature as quickly as possible and before transformation at any other temperature can be substantially complete, and maintaining said transformation temperature until transformation is substantially complete.

4. The method of welding hardenable materials which comprises preheating at least those portions of the material to be welded which will be heat affected in the welding operation to a predetermined elevated transformation temperature to yield desired physical properties, applying a forced fluid quench locally to those portions of the preheated portions of the material to be welded adjacent the desired weld joint while avoiding cooling the material to be melted in forming the weld joint, then making a weld, and permitting the flow of heat from the weld joint and the heat affected regions adjacent into said quenched portions of the material to bring the temperature thereof to said predetermined transformation temperature as quickly as possible and before transformation at any other temperature can be substantially complete, and maintaining said transformation temperature until transformation is substantially complete.

5. The method of welding hardenable materials which comprises preheating at least those portions of the material to be welded which will be heat affected in the welding operation to a predetermined elevated transformation temperature to yield desired physical properties, applying a forced fluid quench to those portions of the material to be welded adjacent the desired weld joint while avoiding cooling the material to be melted in forming the weld joint, then making a weld, then, before the weld has cooled substantially, applying a forced fluid quench to the weld joint and the heat affected regions adjacent thereto as soon as practicable after formation of the joint so as to bring the temperature thereof to said predetermined transformation temperature as quickly as possible and before transformation at any other temperature can be substantially complete, and maintaining said transformation temperature until transformation is substantially complete.

6. The method of welding claimed in claim 1 characterized by the additional steps of rapidly reheating the weld joint and the heat affected regions adjacent thereto to above the lower boundary of the single phase region for the material being welded to refine the grain thereof, rapidly withdrawing heat from the said reheated regions so as to bring the temperature thereof to said predetermined transformation temperature as quickly as possible and before transformation at any other temperature can be substantially complete, and maintaining said transformation temperature until transformation is substantially complete.

7. The method of welding hardenable materials which comprises establishing a predetermined transformation temperature to yield desired physical properties in at least those portions of the material to be welded which will be heat affected in the welding operation, making a weld, then before the weld has cooled substantially applying a forced fluid quench comprising a stream of a gas to the weld joint and the heat affected regions adjacent thereto as soon as practicable after formation of the joint so as to bring the temperature thereof to said predetermined transformation temperature as quickly as possible and before transformation at any other temperature can be substantially complete, and maintaining said transformation temperature until transformation is substantially complete.

8. The method of welding hardenable materials which comprises establishing a predetermined transformation temperature to yield desired physical properties in at least those portions of the material to be welded which will be heat affected in the welding operation, making a weld, then before the weld has cooled substantially applying a forced fluid quench comprising a stream of atomized liquid suspended in a gas to the weld joint and the heat affected regions adjacent thereto as soon as practicable after formation of the joint so as to bring the temperature thereof to said predetermined transformation temperature as quickly as possible and before transformation at any other temperature can be substantially complete, and maintaining said transformation temperature until transformation is substantially complete.

EDWARD A. RICHARDSON.